United States Patent
Simon (10) Patent No.: US 8,664,958 B2
(45) Date of Patent: Mar. 4, 2014

(54) ANTENNA OF AN ELECTROMAGNETIC PROBE FOR INVESTIGATING GEOLOGICAL FORMATIONS

(75) Inventor: Matthieu Simon, Princeton, NJ (US)

(73) Assignee: Schlumberger Technology Corporation, Sugar Land, TX (US)

(*) Notice: Subject to any disclaimer, the term of this patent is extended or adjusted under 35 U.S.C. 154(b) by 451 days.

(21) Appl. No.: 12/595,624

(22) PCT Filed: Apr. 7, 2008

(86) PCT No.: PCT/EP2008/002827
§ 371 (c)(1),
(2), (4) Date: Jan. 25, 2010

(87) PCT Pub. No.: WO2008/125270
PCT Pub. Date: Oct. 23, 2008

(65) Prior Publication Data
US 2010/0176813 A1 Jul. 15, 2010

(30) Foreign Application Priority Data
Apr. 16, 2007 (EP) .................................. 07290464

(51) Int. Cl.
*G01V 3/00* (2006.01)

(52) U.S. Cl.
USPC ........................................ 324/338; 324/339

(58) Field of Classification Search
USPC ............... 324/323–375; 250/253–266; 175/1, 175/40–50; 166/244.1–403; 702/1–18; 73/152.01–152.62; 367/1–86
See application file for complete search history.

(56) References Cited

U.S. PATENT DOCUMENTS

| | | | |
|---|---|---|---|
| 5,406,206 A | 4/1995 | Safinya | |
| 5,469,062 A * | 11/1995 | Meyer, Jr. | 324/338 |
| 5,677,631 A * | 10/1997 | Reittinger et al. | 324/324 |
| 6,603,312 B2 * | 8/2003 | Sinclair | 324/339 |
| 6,777,940 B2 * | 8/2004 | Macune | 324/338 |
| 8,378,908 B2 * | 2/2013 | Wisler et al. | 343/719 |
| 2006/0103389 A1 * | 5/2006 | Bespalov et al. | 324/338 |
| 2007/0145980 A1 * | 6/2007 | Conti et al. | 324/332 |

FOREIGN PATENT DOCUMENTS

GB 2250098 5/1992

* cited by examiner

Primary Examiner — Arleen M Vazquez
Assistant Examiner — Alesa Allgood
(74) Attorney, Agent, or Firm — Stephanie Chi; Jody DeStefanis (57) ABSTRACT

An antenna (3) of an electromagnetic probe used in investigation of geological formations GF surrounding a borehole WBH comprises a conductive base (31) and an antenna element (32). The conductive base (31) comprises an opened non-resonant cavity (33). The antenna element (32) is embedded in the cavity (33) and goes right through the cavity. The antenna element (32) is isolated from the conductive base (31). The antenna element (32) is coupled to at least one electronic module via a first 34A and a second 34B port, respectively. The electronic module operates the antenna so as to define a simultaneously superposed pure magnetic dipole and pure electric dipole.

5 Claims, 7 Drawing Sheets

ANTENNA OF AN ELECTROMAGNETIC PROBE FOR INVESTIGATING GEOLOGICAL FORMATIONS

FIELD OF THE INVENTION

The invention relates to an antenna of an electromagnetic probe for measuring the electromagnetic properties of a subsurface formation in a limited zone surrounding a borehole. Another aspect of the invention relates to a logging tool for performing logs of subsurface formation borehole. Another aspect of the invention relates to a method of investigation of the limited zone surrounding the borehole. A particular application of the probe and the logging tool according to the invention relates to the oilfield services industry.

BACKGROUND OF THE INVENTION

Logging devices that measure formation electromagnetic properties (e.g. dielectric constant) are known, for example from U.S. Pat. Nos. 3,849,721, 3,944,910 and 5,434,507. Typically, a logging device includes a transmitter and spaced receivers mounted in a pad that is urged against a borehole wall of a well bore filled with drilling mud. Microwave electromagnetic energy is transmitted into the formations, and energy that has propagated through the formations is received at the receiving antennas. The phase and amplitude of the energy propagating in the formation is determined from the receiver output signals. The dielectric constant and the conductivity of the formations can then be obtained from the phase and amplitude measurements. The transmitters and receivers comprise antennas that are assimilated to magnetic dipoles. These dipoles are tangential to the pad face and are orientated in different directions. A broadside mode corresponds to the dipoles oriented orthogonally to the pad-axis. An endfire mode corresponds to the dipoles oriented in alignment with the pad axis. The depth of investigation for the broadside mode is very poor. The investigation depth for the endfire mode is greater than for the broadside mode, but the signal is usually weaker, for example at 1 GHz. The attenuation and phase-shift are measured between the two receivers. A simple inversion allows in case of a homogeneous formation to retrieve the dielectric constant and the conductivity. Typically, such a logging device is unable to provide an accurate measurement of the formation properties because of its high sensitivity to the standoff of the pad relatively to the formation or the presence of a mudcake on the borehole wall. For example, in the presence of a mudcake layer the number of unknowns increase from two unknown, namely the permittivity $\epsilon$ and the conductivity $\sigma$ of the formation to five unknowns, namely the permittivity $\epsilon$ and the conductivity a of the formation $(\epsilon, \sigma)_{gf}$ and of the mudcake $(\epsilon, \sigma)_{mc}$, and the mudcake thickness $t_{mc}$. Consequently, accurate determination of the formation electromagnetic properties based on the attenuation and phase-shift measurements is not possible.

The patent U.S. Pat. No. 5,345,179 proposes a solution to improve the logging device response and accuracy in the presence of a mudcake. The logging device comprises a plurality of cross-dipole antennas, each being located in a cavity. The cross-dipole antenna houses both endfire and broadside polarizations in the same cavity.

Typically, such a cross dipole antenna comprises two wires embedded in a non-resonant cavity filled with a dielectric material and short-circuited to the conductive cavity wall at one end.

The current distribution J is approximated from the analogy with a short-circuited transmission line. The current distribution on the radiating wire in the cavity can be approximated to:

$$J(y)=J_0 \cos(k_0[y-a])$$

where:
 $J_0$ is the current amplitude,
 a is the aperture size,
 $k_0$ is the wave number in the cavity and is equal to:

$$k_0 = \frac{\omega}{c}\sqrt{\varepsilon_{cavity}},$$

$\epsilon_{cavity}$ is the relative dielectric constant of the material filling the cavity,
 $\omega$ is the angular frequency, and
 c is the speed of light in vacuum.

The current is maximal at the short-circuit location. This cosinusoidal and asymmetric current distribution excites a strong, parasitic electric dipole.

The current flowing on the wire, excites modes in the cavity. The dominant mode is the transverse electric mode $TE_{10}$. This mode contributes to a radiation pattern, which is close to a magnetic point dipole m orthogonal to the wire. The current distribution on the wire will also excite parasitic modes, the dominant one being the transverse magnetic mode $TM_{11}$. This mode corresponds to an electric dipole p normal to the aperture.

These parasitic modes cause a strong asymmetry of the electromagnetic field Ey and Ez in the yz plane.

The antennas of the prior art are far from being pure magnetic dipoles. In particular, the parasitic electric dipole, normal to the aperture affects the measurement accuracy.

Further, as the mudcake electromagnetic properties are not determined, the inversion calculation for determining the geological formation electromagnetic properties may not be robust.

The patent application EP 07290149.9 filed on 6 Feb. 2007 describes an improved antenna associated with electronic circuitry enabling to choose the mode of operation of the antenna: either as a pure electric dipole or as a pure magnetic dipole. However, the electronic circuitry requires the use of transformers and switches, or phase-shifters, which are costly and lead to a certain complexity.

SUMMARY OF THE INVENTION

One goal of the invention is to propose an antenna and an electromagnetic probe comprising at least one of such an antenna enabling measurement of the electromagnetic properties of a subsurface formation in a limited zone surrounding a borehole avoiding, at least reducing the drawbacks of the prior art antennas and probes.

According to a first aspect, the invention relates to an antenna combining an antenna element having a simple mechanical design with an appropriate electronic circuit determining the behavior of the antenna as a superposition of a substantially pure electric dipole and a substantially pure magnetic dipole.

More precisely, the first aspect of the present invention relates to an antenna of an electromagnetic probe used in investigation of geological formations surrounding a borehole comprising a conductive base and an antenna element, the conductive base comprising an opened non-resonant cavity, the antenna element being embedded in the cavity and going right through the cavity, the antenna element being isolated from the conductive base, the antenna element being coupled to at least one electronic module via a first and a second port, respectively, the electronic module operating the antenna so as to define a simultaneously superposed pure magnetic dipole and pure electric dipole.

Advantageously, the antenna element may be a wire strip. The cavity may have a parallelepipedic, or an elliptical, or a cylindrical shape. The cavity may be filled with a dielectric material.

The electronic module comprises a transmitting module comprising a first power amplifier coupled to the first port and a second power amplifier coupled to the second port of the antenna element.

Further, the electronic module comprises a receiving module comprising a first low-noise amplifier coupled to the first port and a second low-noise amplifier coupled to the second port of the antenna element.

Still another aspect of the invention relates to antenna module comprising an antenna of an electromagnetic probe according to the invention. The conductive base may further comprise a printed circuit board coupled to the antenna by means of the ports, the printed circuit board comprising the at least one electronic module and a control and processing module.

Another aspect of the invention relates to an electromagnetic logging apparatus used in investigation of geological formations surrounding a borehole, comprising:
  a logging tool moveable through the borehole,
  an electromagnetic probe comprising a pad mounted on the logging device, adapted for engagement with the borehole wall by a wall-engaging face of the pad,
  at least one antenna mounted in the wall-engaging face and used as a transmitting antenna,
  a plurality of spaced antennas mounted in the wall-engaging face and used as receiving antennas positioned in spaced relation to the transmitting antenna,
  a transmitter module adapted for energizing the transmitting antenna to transmit electromagnetic energy into the formations at a determined frequency, and
  a receiver module adapted for receiving and processing an output signal at each of the receiving antennas representative of electromagnetic energy received from the formations,
wherein at least one of the receiving or transmitting antennas is an antenna according to the invention.

A further aspect of the present invention relates to a method of investigation of geological formations surrounding a borehole using an electromagnetic logging apparatus comprising at least one transmitting antenna and at least one receiving antenna according to the invention, wherein the method comprises the steps of:
a) running the logging apparatus through the borehole and engaging a pad with a borehole wall so as to define a selected zone made of a medium to be investigated,
b) performing a first set of measurements by:
  b1) operating the antennas so that each antenna defines a superposed pure magnetic dipole and pure electric dipole by activating a first port of the transmitting antenna, and radiating electromagnetic signals in the medium,
  b2) measuring a first and a second sub-set of attenuation and phase shift of the electromagnetic signals having traveled in the medium between the transmitting and receiving antennas at a first port and a second port of the receiving antenna, respectively,
c) performing a second set of measurements by:
  c1) operating the antennas so that each antenna defines a superposed pure magnetic dipole and pure electric dipole by activating a second port of the transmitting antenna, and radiating electromagnetic signals in the medium,
  c2) measuring a third and a fourth sub-set of attenuation and phase shift of the electromagnetic signals having traveled in the medium between the transmitting and receiving antennas at the first port and the second port of the receiving antenna, respectively,
d) combining the first and the second set of measurements and mathematically extracting a first contribution due to the pure magnetic dipole and a second contribution due to the pure electric dipole, and
e) performing an inversion calculation based on the first and second contribution and determining the permittivity $\epsilon$ and the conductivity $\sigma$ of the in the selected zone.

The first set of measurements and the second set of measurements may be performed sequentially, the first and second ports being activated by electrical signals having identical frequencies.

Alternatively, the first set of measurements and the second set of measurements may be performed simultaneously, the first and second ports being activated by electrical signals having different frequencies.

In a configuration where the electromagnetic logging apparatus comprises at least two transmitting antennas and at least two receiving antennas, the method further comprises performing differential measurements between the attenuation and phase shift measured at the ports of the at least two receiving antennas and applying a borehole compensation scheme so as to eliminate each antenna gain.

The antenna for an electromagnetic probe of the invention used in geological surveys enables a better measurement accuracy of the formations electromagnetic properties than the antenna of the electromagnetic propagation tool as described in the prior art. In particular, with the invention, it is possible to perform accurate measurement even if a mudcake covers the well bore wall, and whatever the nature of the mudcake (e.g. oil-based-mud or water-based-mud).

Further, while in the prior art, the mode of operation of the antenna, namely either an electric dipole mode (EDM) or a magnetic dipole mode (MDM) is selected by the electronic circuitry, the invention enables exciting said two modes simultaneously and subsequently separating them mathematically. Therefore, the electronic circuitry required by the invention is simpler than in the prior art.

BRIEF DESCRIPTION OF THE DRAWINGS

The present invention is illustrated by way of examples and not limited to the accompanying figures, in which like references indicate similar elements.

DETAILED DESCRIPTION OF THE INVENTION

Figure 1:
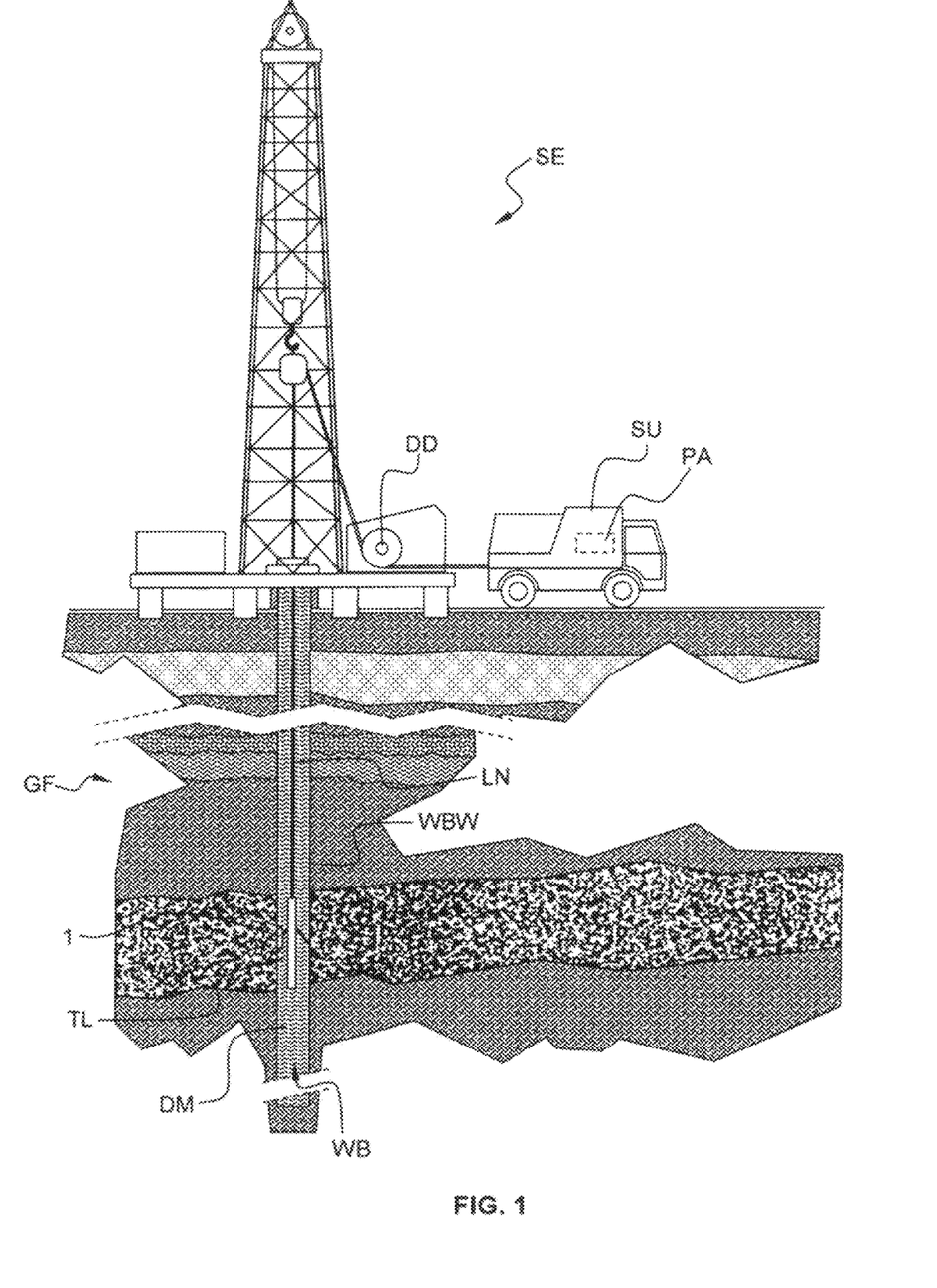
FIG. 1 schematically illustrates a typical onshore hydrocarbon well location.

FIG. 1 schematically shows a typical onshore hydrocarbon well location and surface equipments SE above a hydrocarbon geological formation GF after drilling operations have been carried out. At this stage, i.e. before a casing string is run and before cementing operations are carried out, the wellbore is a borehole WB filled with a fluid mixture DM. The fluid mixture DM is typically a mixture of drilling fluid and drilling mud. In this example, the surface equipments SE comprise an oil rig and a surface unit SU for deploying a logging tool TL in the well-bore. The surface unit may be a vehicle coupled to the logging tool by a line LN. Further, the surface unit comprises an appropriate device DD for determining the depth position of the logging tool relatively to the surface level. The logging tool TL comprises various sensors and provides various measurement data related to the hydrocarbon geological formation GF and/or the fluid mixture DM. These measurement data are collected by the logging tool TL and transmitted to the surface unit SU. The surface unit SU comprises appropriate electronic and software arrangements PA for processing, analyzing and storing the measurement data provided by the logging tool TL. Alternatively, the measurement data may be processed, analyzed and stored downhole in the logging tool TL.

The logging tool TL comprises a probe 1 for measuring the electromagnetic properties of a subsurface formation according to the invention. Once the logging tool is positioned at a desired depth, the probe 1 can be deployed from the logging tool TL against the borehole wall WBW by an appropriate deploying arrangement, for example an arm.

Figure 2:
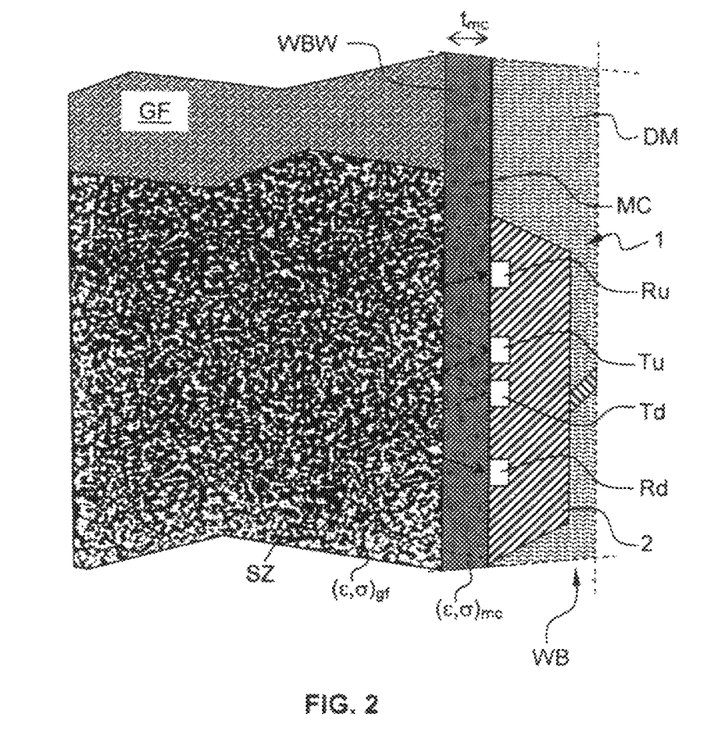
FIG. 2 schematically shows a cross-section view of a pad positioned into a borehole and contacting a mudcake formed onto the borehole wall.
Figure 3:
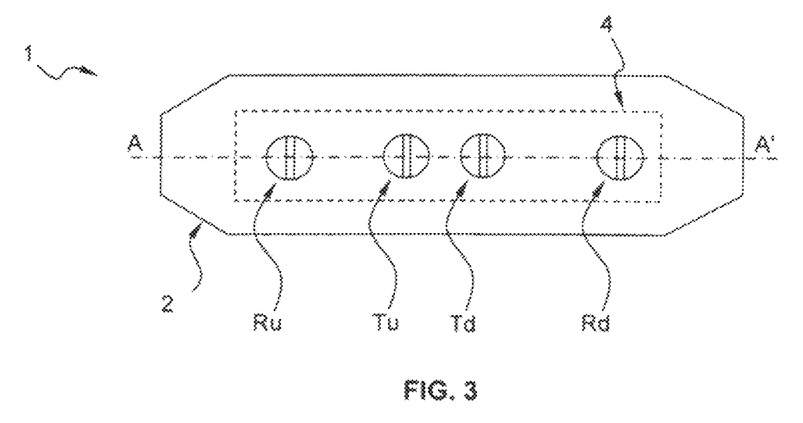
FIG. 3 schematically shows a borehole wall contacting side view of a pad for measuring the electromagnetic properties of a subsurface formation comprising antennas according to the invention.

FIGS. 2 and 3 schematically show a cross-section view and a well-bore wall contacting face view of the probe 1. The probe 1 comprises a pad 2. The pad is a conductive metal housing, for example made in a metallic material like stainless steel arranged to be positioned in contact with a well-bore wall WBW. The pad 2 is coupled to the tool TL by an arm (FIG. 2 only shows a portion of said arm). The arm enables the deployment of the pad 2 into the borehole WB against the well-bore wall WBW. Typically, the borehole is filled with drilling mud DM.

The probe 1 further comprises transmitting and receiving antennas, for example two transmitting antennas Tu and Td (u stands for up and d stands for down), and two receiving antennas Ru and Rd. The transmitting antennas Tu and Td and the receiving antennas Ru and Rd are positioned in the pad along a line AA' in the pad face arranged to be positioned in contact with the well-bore wall WBW. The number of the transmitting and receiving antennas, and their positions relatively to each other, as illustrated in FIG. 3, is only an example. The number and positions of the transmitting and receiving antennas may be different. Also, in the present description, each antenna is either always used as a transmitting antenna or always used as a receiving antenna. Nevertheless, an antenna is not limited to a specific function; each antenna may be used as receiving antenna and subsequently as transmitting antenna, or vice-versa by means of a switch for connecting the antenna to the appropriate electronic module (transmitter module or receiver module).

The probe 1 further comprises an electronic arrangement 4 connected to the transmitting and receiving antennas. Typically, the electronic arrangement 4 is designed such that the antenna may operate in a frequency range from around 10 MHz to around 2 GHz. The electronic arrangement 4 comprises at least one transmitter module and at least one receiver module. Each transmitter module is arranged to excite the transmitting antennas Tu and/or Td by applying an excitation signal. Microwave electromagnetic energy (illustrated by dotted lines in FIG. 2) is transmitted into the formations, and energy that has propagated through the formations is received at the receiving antennas. Each receiver module is arranged to determine an attenuation and a phase shift of a reception signal provided by the receiving antenna Ru and Rd relatively to the excitation signal. The dielectric constant and the conductivity of the formations can then be obtained from the phase and amplitude measurements.

Additionally, the electromagnetic probe 1 may comprise other type of sensors (not shown), for example a temperature sensor, for measuring characteristic parameters of the fluid mixture, the mudcake, and/or the formation.

One or more coaxial cables (not shown) may be run though the arm for connecting the electronic arrangement 4 with the tool TL. The tool TL contains the bulk of the down-hole electronics (not shown) and provides energy and control commands, and gathers measurements from the electromagnetic probe 1. Alternatively, the electronic arrangement 4 may comprise a data communication module (not shown) for directly transmitting measurements to the surface equipment SE and receiving control commands from it.

FIGS. 4, 5, 6 and 7 schematically show an antenna 3 according to different embodiments of the invention. The antenna 3 that will be described hereinafter according to the different embodiments may be used as a transmitting antenna (e.g. the transmitting antennas Tu, Td of FIGS. 2 and 3) or as a receiving antenna (e.g. the receiving antennas Ru, Rd of FIGS. 2 and 3).

Figure 4:
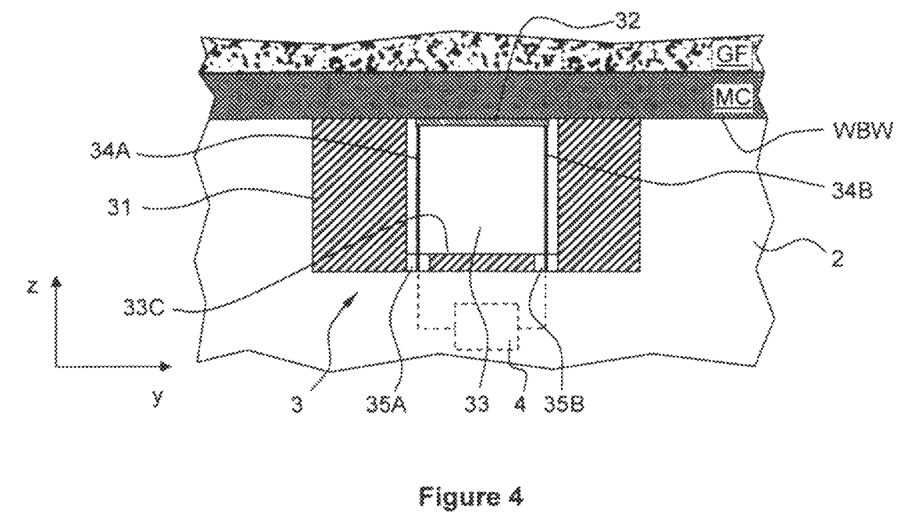
FIGS. 4 and 5 are a cross-section view, and a partial perspective and cross-section view showing an antenna according to a first embodiment of the invention, respectively.
Figure 6:
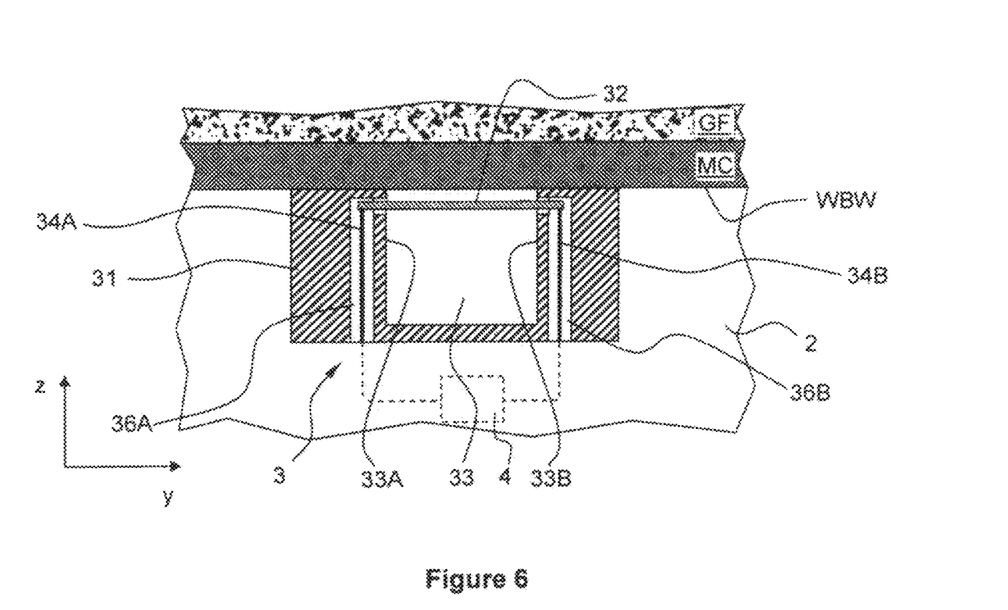
FIGS. 6 and 7 are cross-section views schematically showing antennas according to a second and a third embodiment of the invention, respectively.
Figure 7:
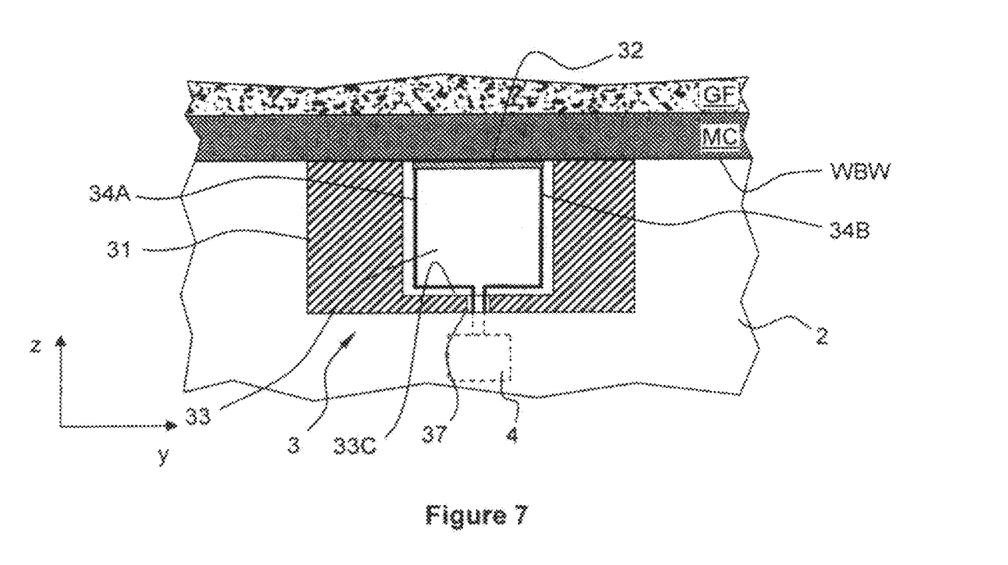

In FIGS. 4, 6 and 7, the antenna is shown fitted into the pad 2, while the pad contacts the well-bore wall WBW. Typically, as in this example, the medium which is investigated consists in the formation GF covered by a mudcake MC. The mudcake MC is formed on the wellbore wall WBW by the screening of the particles of mud suspended into the fluid mixture when the fluid mixture invades the formation GF.

The antenna 3 comprises a conductive base 31 and a first antenna element 32. The conductive base 31 comprises an open, non-resonant cavity 33.

The cavity 33 has a elliptical or a cylindrical shape. Nevertheless, the cavity 33 may have other shapes, for example a parallelepipedic shape (not shown). As example, the aperture size a defined by such cavity may be around 10 mm. Advantageously, the cavity is filled with a dielectric material. Any dielectric material may be used as the dielectric constant of said material filling the cavity has no impact on the radiation purity. Alternatively, an element in a ferrite material (not shown) may be inserted into the cavity. The ferrite material increases the magnetic dipole moment, while not changing the electric dipole moment.

The antenna element 32 goes right through the cavity while not contacting the cavity walls. The antenna element 32 is coupled to the electronic arrangement 4 by means of a first 34A and second 34B port. The port comprises a connection wire. Advantageously, the antenna element 32 is coupled at the first 34A and second 34B port at each of its ends. Advantageously, the couplings between each of the two ports and the electronic arrangement have the same length.

Advantageously, the antenna element 32 is positioned closed to the cavity 33 opening, while not protruding outside the cavity because the pad may be move against the well bore wall during logging operation. Advantageously, the antenna element 32 is in contact with the geological formation when the pad 2 is deployed against the borehole wall. However, in certain application, it may be advantageous that the cavity is closed by a cover or window (not shown) in order to retain and protect the dielectric material. Advantageously, the cover is made of a protective material, resistant to abrasion, for example PEEK (thermoplastic PolyEtherEtherKeton). However, any other material that does not perturb high-frequency-wave propagation and shows an appropriate mechanical resistance to abrasion is acceptable.

The antenna element 32 may have a strip shape. As an example, the width of the strip is around 5 mm. The resistance against abrasion, the electric dipole moment, and the sensitivity (in particular sensitivity in reflection in a substantially pure electrical dipole mode EDM) may be improved by increasing the width of the strip.

In the example of FIG. 3, the antennas are oriented such that each antenna element 32 is perpendicular to the pad axis, thus perpendicular to the borehole axis. This corresponds to a preferred configuration in which the magnetic dipole is parallel to the pad axis AA'. This configuration enables deeper measurements in the geological formations. However, in certain application, it may be interesting that the antennas are oriented such that the antenna element is in alignment with the pad axis, thus parallel to the borehole axis (such a configuration is not shown in the drawings).

Figure 5:
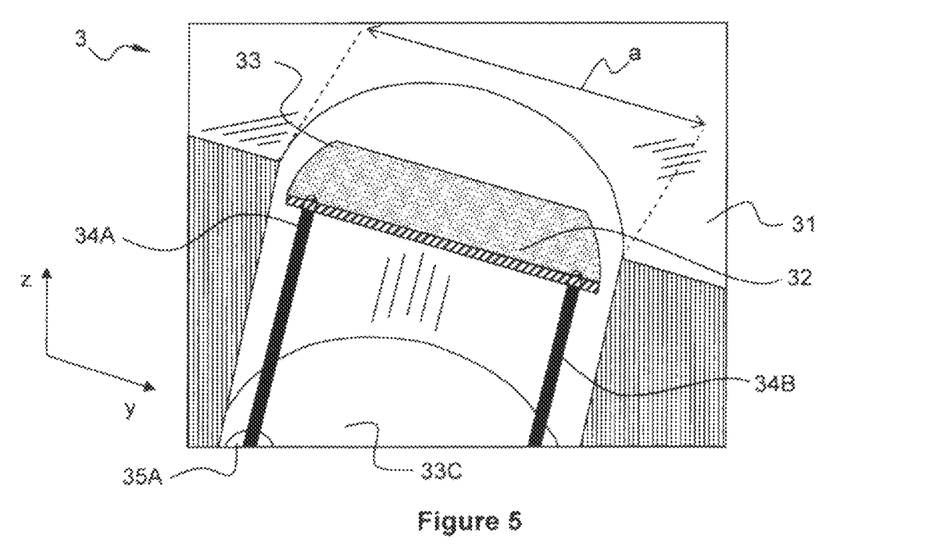

FIGS. 4 and 5 illustrate the antenna 3 according to a first embodiment. The first 34A and second 34B ports pass through the conductive base 31 by means of first 35A and second 35B openings. The openings 35A, 35B are positioned into the bottom 33C of the cavity straight underneath the antenna element ends. The first 34A and second 34B ports extend into the cavity 33. Advantageously, the ports 34A, 34B are insulated relatively to the conductive base at least when passing through the openings. As an alternative, the openings 35A, 35B are filled with an insulating material in order to insulate the connection wires of the ports relatively to the conductive base and maintain the positioning of the antenna element 32 into the cavity 33.

FIG. 6 illustrates the antenna 3 according to a second embodiment. The first 34A and second 34B ports pass through the conductive base 31 by means of first 36A and second 36B inversed L-shaped tunnels. The tunnels extend from the bottom of the conductive base 31 and emerge into the cavity 33 by the lateral walls 33A, 33B close to the top of the cavity. The antenna element 32 extends all along the cavity aperture. As illustrated in FIG. 6, the antenna element 32 may also extends into a portion of the first 36A and second 36B tunnels. The first 34A and second 34B ports extend into the first 36A and second 36B tunnels. Advantageously, the ports 34A, 34B are insulated relatively to the conductive base 31 all along the tunnels 35A, 35B. Further, the ends of the antenna element 32 when extending into the portion of the first 35A and second 35B tunnels are also insulated relatively to the conductive base 31.

FIG. 7 illustrates the antenna 3 according to a third embodiment. The third embodiment differs from the first one in that the first 35A and second 35B openings positioned into the bottom of the cavity 33 are replaced by a unique opening 37. The unique opening 37 is positioned substantially at the center of the bottom 33C of the cavity 33. Advantageously, the ports 34A, 34B are insulated relatively to the conductive base and relatively to each other at least when passing through the openings.

In the various embodiments, the metallic parts of the antenna may be gold-plated in order to minimize Ohmic losses. The antenna 3 may be designed under the form of an antenna module inserted into a slot of the pad 2. In this case, the conductive base 31 may advantageously comprise a printed-circuit board (not shown) coupled to the antenna element 32 by means of the port 34A, 34B. The printed-circuit board may comprise an impedance-matching network. The impedance-matching network enables maximizing the power transmitted into the formation when the antenna is a transmitter, or, by reciprocity, the power received when the antenna is a receiver. Advantageously, the printed circuit board and the impedance-matching network are located closely to the antenna element in order to improve its efficiency. For example, the printed-circuit board may be located at a distance inferior to a size of the cavity from the antenna element. Finally, the matching network may be designed for several discrete frequencies with passive components (inductances or capacitances) or active components (variable capacitance). The active components enable operating in a frequency range from 0.01 GHz to 2.0 GHz with a maximized efficiency.

Figure 8:
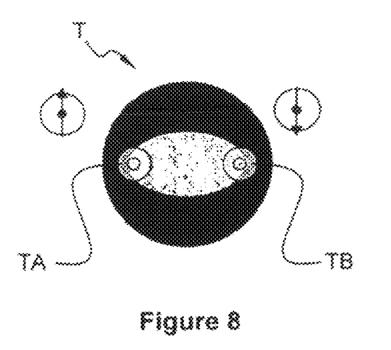
FIGS. 8 and 9 are top view schematically showing a transmitting antenna and a receiving antenna according to the invention operated into a mixed pure magnetic and electric dipole mode, respectively.
Figure 9:
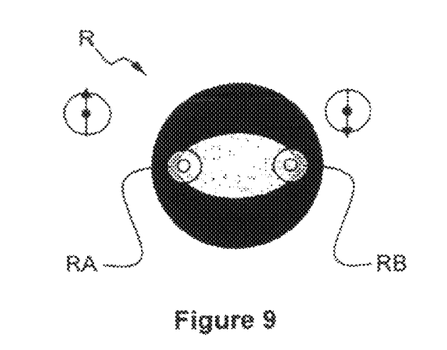

In FIGS. 8, 9, 10, 11 and 12, the receiving R and transmitting T antenna are identical to antenna 3 described hereinbefore with relation to FIG. 4-7. In FIGS. 8 and 9, a circle represents an electric dipole, while an arrow represents a magnetic dipole. The electric dipole is oriented perpendicularly to the plan defined by the cavity opening of the antenna. The magnetic dipole is parallel to the plan defined by the cavity opening of the antenna.

Figure 10:
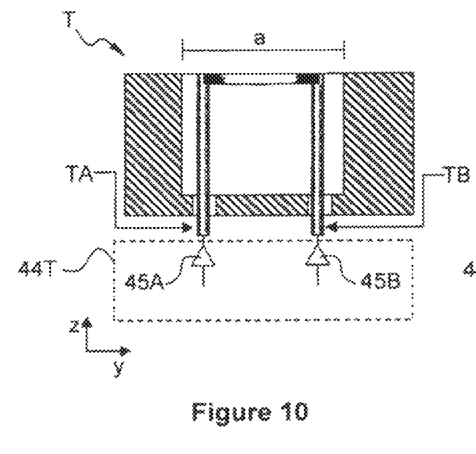
FIGS. 10 and 11 illustrate portions of a transmitting circuit and a receiving circuit coupled to an antenna according to the invention enabling operation into a mixed pure magnetic and electric dipole mode, respectively.

FIGS. 8 and 10 are a top view and a cross-section view schematically showing a transmitting antenna T, respectively. FIG. 10 further schematically illustrates a part of the electronic module 4. The ports TA, TB of the antenna element used as a transmitter T are coupled to a transmitter module 44T. As an example, the transmitter module 44T comprises two power amplifiers 45A and 45B. The output of the first amplifier 45A is connected to the first port TA while the output of the second amplifier 45B is connected to the second ports TB of the antenna used as a transmitter T. Thus, a port dependent voltage may be applied to each end of the antenna. With such a transmitter module 44T, the antenna may be operated so as to define a superposed pure magnetic dipole and pure electric dipole.

Figure 11:
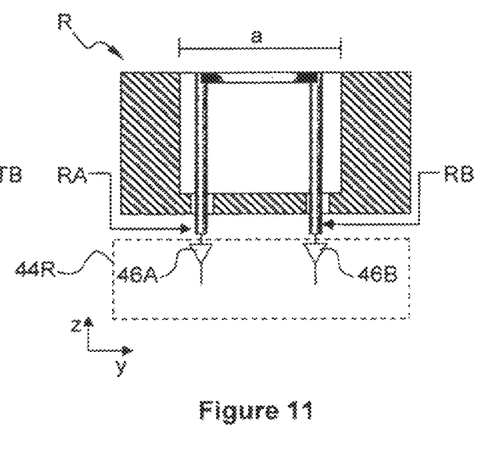

FIGS. 9 and 11 are a top view and a cross-section view schematically showing a receiving antenna R, respectively. FIG. 11 further schematically illustrates a part of the electronic module 4. The ports RA, RB of the antenna element used as a receiver R are coupled to a receiver module 44R. As an example, the receiver module 44R comprises two low noise amplifiers 46A and 46B. The input of the first amplifier 46A is connected to the first port RA while the input of the second amplifier 46B is connected to the second ports RB of the antenna used as a receiver R. Thus, a port dependent voltage may be measured to each end of the antenna. With such a receiver module 44R, the antenna is operated so as to define a superposed pure magnetic dipole and pure electric dipole.

Figure 12:
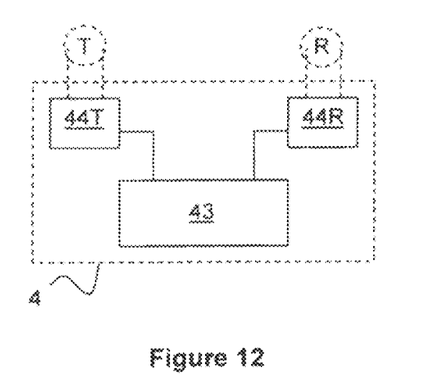
FIG. 12 schematically shows the electronic module shown in FIGS. 3, 4, 6 and 7.

FIG. 12 schematically shows the electronic module 4. The transmitter 44T and receiver 44R modules are coupled to a control and processing module 43. The control and processing module 43 commands the operation of the transmitting T and receiving R antenna. The calculation performed by the control and processing module 43 based on the measurements provided by the receiver will be described hereinafter.

With the antenna of the invention and the above described transmitter, receiver, and control and processing modules, the electric dipole mode (EDM) and the magnetic dipole mode (MDM) are excited simultaneously and separated mathematically. Preferably, the impedances on the two ports for each antenna should be very close.

With the transmitter module of the invention and for a suitable load impedance, the antenna will behave as the superposition of a pure magnetic dipole and a pure electric dipole, with a current distribution given by:

$$J(y) = J_0 \cos\left(k_0 \left[y - \frac{a}{2}\right] + \varphi\right)$$

where:
$J_0$ is the current amplitude,
a is the aperture size,
$k_0$ is the wave number in the cavity and is equal to:

$$k_0 = \frac{\omega}{c}\sqrt{\varepsilon_{cavity}},$$

$\varepsilon_{cavity}$ is the relative dielectric constant of the material filling the cavity,
ω w is the angular frequency,
c is the speed of light in vacuum, and
φ is a phase depending on the load impedance.

According to a first alternative, the control and processing module 43 activates the transmitting module such that the first port TA and the second port TB of the transmitting antenna are activated sequentially, i.e. port TA and then port TB or conversely. In this alternative, the frequency of the signal exciting the transmitting antenna via the first and second ports may be the same, for example 1 GHz. The receiving antenna and the receiving module receive the signals on the two ports RA, RB simultaneously.

According to a second alternative, the control and processing module 43 activates the transmitting module such that the first port TA and the second port TB of the transmitting antenna are activated simultaneously. In this alternative, the frequency of the signal exciting the transmitting antenna via the first and second ports must be different, for example the first port TA is excited by a signal having a frequency of 1 GHz, while the second port TB is excited by a signal having a frequency of 1 GHz+10 kHz. The receiving antenna and the receiving module receive the signals on the two ports RA, RB simultaneously. The difference in frequency enables the control and processing module 43 distinguishing between the received signals resulting from the excitation of the first port TA relatively to the second port TB.

Four signals can be obtained from the different combinations: transmitter ports TA or TB and receiver ports RA and RB.

These signals depend on the combined antenna and electronic elements gain α, the electric dipole length of the transmitter $l_T$ and the receiver $l_R$, the magnetic dipole area of the transmitter $S_T$ and the receiver $S_R$, and the medium.

It is assumed that the transmitter antenna and the receiver antenna can be different and that in an antenna, the ports A and B are mechanically symmetrical and have the same load impedance:

$$\begin{cases} \lambda_T = \lambda_{TA} = \lambda_{TB} \\ \lambda_R = \lambda_{RA} = \lambda_{RB} \\ S_T = S_{TA} = S_{TB} \\ S_R = S_{RA} = S_{RB} \end{cases}$$

The influence of the medium may be expressed with a first function $f_{EDM}$ corresponding to antennas operating in a pure electric dipole mode and $f_{MDM}$ corresponding to antennas operating in a pure magnetic dipole mode. Both functions depend on the wave number k and the distance between the antennas r.

These signals can be written as:

$$\begin{cases} V_{TA-RA} = \alpha_{TA}\alpha_{RA}\lambda_T\lambda_R f_{EDM}(k,r) + \alpha_{TA}\alpha_{RA}S_T S_R f_{MDM}(k,r) \\ V_{TA-RB} = \alpha_{TA}\alpha_{RB}\lambda_T\lambda_R f_{EDM}(k,r) - \alpha_{TA}\alpha_{RB}S_T S_R f_{MDM}(k,r) \\ V_{TB-RA} = \alpha_{TB}\alpha_{RA}\lambda_T\lambda_R f_{EDM}(k,r) - \alpha_{TB}\alpha_{RA}S_T S_R f_{MDM}(k,r) \\ V_{TB-RB} = \alpha_{TB}\alpha_{RB}\lambda_T\lambda_R f_{EDM}(k,r) + \alpha_{TB}\alpha_{RB}S_T S_R f_{MDM}(k,r) \end{cases}$$

where:

$f_{MDM}(k,r)$ is proportional to $\frac{e^{ikr}}{2\pi r^3}(1-ikr)$, and $f_{EDM}(k,r)$ is proportional to $\frac{e^{ikr}}{4\pi r^3}(1-ikr-k^2r^2)$ By combining these data, the signals related to the pure electric dipole $V_{EDM}$ and the pure magnetic dipole $V_{MDM}$ can be extracted and rendered only dependent on the function f and the gain G of the transmitting and receiving antennas:

$$V_{EDM} = \sqrt{V_{TA-RA} \times V_{TB-RB}} + \sqrt{V_{TA-RB} \times V_{TB-RA}}$$
$$= 2\sqrt{\alpha_{TA}\alpha_{RA}\alpha_{TB}\alpha_{RB}} \times \lambda_T\lambda_R \times f_{EDM}(k,r), \text{ and}$$
$$= G_{EDM}^T \times G_{EDM}^R \times f_{EDM}(k,r)$$

$$V_{MDM} = \sqrt{V_{TA-RA} \times V_{TB-RB}} - \sqrt{V_{TA-RB} \times V_{TB-RA}}$$
$$= 2\sqrt{\alpha_{TA}\alpha_{RA}\alpha_{TB}\alpha_{RB}} \times S_T S_R \times f_{MDM}(k,r)$$
$$= G_{MDM}^T \times G_{MDM}^R \times f_{MDM}(k,r)$$

Then, a known borehole compensation method can then be applied. The borehole compensation method enables eliminating the gains of the receiving antennas that may be slightly different. For example, an electromagnetic logging apparatus comprising a set of four antennas is considered, namely the configuration shown in FIGS. 2 and 3 with two transmitting antennas $T_u$, $T_d$ and two receiving antennas $R_u$, $R_d$. Each antenna having two ports A and B, this configuration enables obtaining 16 signals. Then, the above formulae become:

$$\begin{cases} V_{EDM}(T_u, R_u) = G_{EDM}^{T_u} \times G_{EDM}^{R_u} \times f_{EDM}(k, r_1) \\ V_{EDM}(T_u, R_d) = G_{EDM}^{T_u} \times G_{EDM}^{R_d} \times f_{EDM}(k, r_2) \\ V_{EDM}(T_d, R_u) = G_{EDM}^{T_d} \times G_{EDM}^{R_u} \times f_{EDM}(k, r_2) \\ V_{EDM}(T_d, R_d) = G_{EDM}^{T_d} \times G_{EDM}^{R_d} \times f_{EDM}(k, r_1), \end{cases}$$

and $$\begin{cases} V_{MDM}(T_u, R_u) = G_{MDM}^{T_u} \times G_{MDM}^{R_u} \times f_{MDM}(k, r_1) \\ V_{MDM}(T_u, R_d) = G_{MDM}^{T_u} \times G_{MDM}^{R_d} \times f_{MDM}(k, r_2) \\ V_{MDM}(T_d, R_u) = G_{MDM}^{T_d} \times G_{MDM}^{R_u} \times f_{MDM}(k, r_2) \\ V_{MDM}(T_d, R_d) = G_{MDM}^{T_d} \times G_{MDM}^{R_d} \times f_{MDM}(k, r_1) \end{cases}$$

These signals can be combined and related to the measured attenuation AT and phase-shift PS:

$$AT_{EDM} - iPS_{EDM} = \ln\left(\sqrt{\frac{V_{EDM}(T_u, R_d)}{V_{EDM}(T_u, R_u)} \times \frac{V_{EDM}(T_d, R_u)}{V_{EDM}(T_d, R_d)}}\right) =$$

$$\ln\left(\sqrt{\frac{G_{EDM}^{T_u} \times G_{EDM}^{R_d} \times f_{EDM}(k, r_2)}{G_{EDM}^{T_u} \times G_{EDM}^{R_u} \times f_{EDM}(k, r_1)} \times \frac{G_{EDM}^{T_d} \times G_{EDM}^{R_u} \times f_{EDM}(k, r_2)}{G_{EDM}^{T_d} \times G_{EDM}^{R_d} \times f_{EDM}(k, r_1)}}\right),$$

and $$AT_{MDM} - iPS_{MDM} = \ln\left(\sqrt{\frac{V_{MDM}(T_u, R_d)}{V_{MDM}(T_u, R_u)} \times \frac{V_{MDM}(T_d, R_u)}{V_{MDM}(T_d, R_d)}}\right) =$$

$$\ln\left(\frac{G_{MDM}^{T_u} \times G_{MDM}^{R_d} \times f_{MDM}(k, r_2)}{G_{MDM}^{T_u} \times G_{MDM}^{R_u} \times f_{MDM}(k, r_1)} \times \frac{G_{MDM}^{T_d} \times G_{MDM}^{R_u} \times f_{MDM}(k, r_2)}{G_{MDM}^{T_d} \times G_{MDM}^{R_d} \times f_{MDM}(k, r_1)}\right)$$

This expression can be reduced to expression that only depends on the functions f and not anymore on the gain G, namely:

$$AT_{EDM} - iPS_{EDM} = \ln\left(\frac{f_{EDM}(k, r_2)}{f_{EDM}(k, r_1)}\right),$$

and $$AT_{MDM} - iPS_{MDM} = \ln\left(\frac{f_{MDM}(k, r_2)}{f_{MDM}(k, r_1)}\right)$$

Thus, by measuring the attenuation AT and phase-shift PS of the signals at the receiving antennas relatively to the transmitting antennas operated according to a superposed pure magnetic dipole and pure electric dipole mode, it is possible to mathematically separate the contribution of each mode and to determine the electromagnetic properties of the medium by means of a simple mathematical inversion operation.

Figure 13:
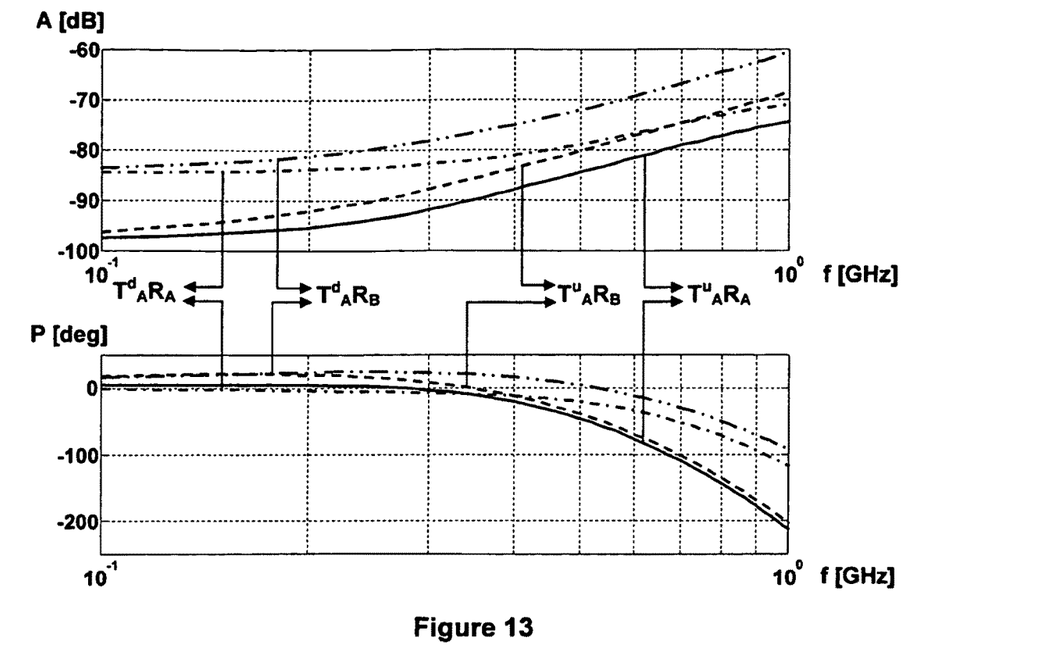
FIG. 13 is a top and bottom graphic showing curves representing the amplitude and the phase of the different signals measured at the port of a receiving antenna according to the invention, respectively.

The top graphic of FIG. 13 shows four curves representing the amplitude A of the different signals measured at the port of a receiving antenna. The bottom graphic of FIG. 13 also shows curves representing the phase P of the different signals measured at the port of a receiving antenna. These measurements have been obtained with an electromagnetic logging apparatus comprising a set of three antennas, a first $T_u$ and a second $T_d$ transmitting antenna and one receiving antenna R spaced apart from the transmitting antennas. Each antenna has two ports A and B. In this particular configuration, only port A of the transmitting antennas have been excited. The signals shown are:

$T^d_A R_A$ representing the signal received on port A of the receiving antenna R caused by the excitation of port A of the downside transmitting antenna Td;

$T^d_A R_B$ representing the signal received on port B of the receiving antenna R caused by the excitation of port A of the downside transmitting antenna Td;

$T^u_A R_A$ representing the signal received on port A of the receiving antenna R caused by the excitation of port A of the upside transmitting antenna Tu; and $T^u_A R_B$ representing the signal received on port B of the receiving antenna R caused by the excitation of port A of the upside transmitting antenna Tu.

The same curves can be obtained with an ideal configuration based on the configuration shown in FIGS. 2 and 3 with two transmitting antennas $T_u$, $T_d$ and two receiving antennas $R_u$, $R_d$ where all the antennas are identical, namely:

$T^d_A R_A = T^d_A R^u_A = T^d_B R^u_B = T^u_A R^d_A = T^u_B R^d_B$;
$T^d_A R_B = T^d_A R^u_B = T^d_B R^u_A = T^u_A R^d_B = T^u_B R^d_A$;
$T^u_A R_A = T^u_A R^u_A = T^u_B R^u_B = T^d_A R^d_A = T^d_B R^d_B$; and
$T^u_A R_B = T^u_A R^u_B = T^u_B R^u_A = T^d_A R^d_B = T^d_B R^d_A$.

The external medium is characterized by a permittivity $\epsilon=15$ and a conductivity $\sigma=0.2$ S/m. The distance between the two transmitting antennas is 25 mm. The distance between the first transmitting antenna $T_u$ and the receiving antenna R is 37.5 mm.

By combining the above mentioned measurements, two attenuation values AT (EDM and MDM) and two phase-shift values PS can be determined. These values can be compared to theoretical ones.

The theoretical values of the attenuation AT and phase-shift PS may be calculated with the following formulae which assume a homogeneous medium and no mudcake onto the borehole wall.

For the magnetic dipole mode (MDM), the theoretical values are given by:

$$AT_{MDM} - iPS_{MDM} = 3\ln\left(\frac{r_2}{r_1}\right) + ik(r_1 - r_2) + \ln\left(\frac{1 - ikr_2}{1 - ikr_1}\right)$$

For the electric dipole mode (EDM), the theoretical values are given by:

$$AT_{EDM} - iPS_{EDM} = 3\ln\left(\frac{r_2}{r_1}\right) + ik(r_1 - r_2) + \ln\left(\frac{1 - ikr_2 - k^2 r_2^2}{1 - ikr_1 - k^2 r_1^2}\right)$$

where:
r1 and r2 are the distances between transmitters and receivers,
the wave number k is given by:

$$k = \frac{\omega}{c} \sqrt{\mu_r} \sqrt{\varepsilon + i\sigma/\omega\varepsilon_0},$$

$\epsilon$ is the relative medium permittivity,
$\sigma$ is the medium conductivity, and
$\mu_r$ is the relative magnetic permeability (typically equal to 1 for logging application).

Figure 14:
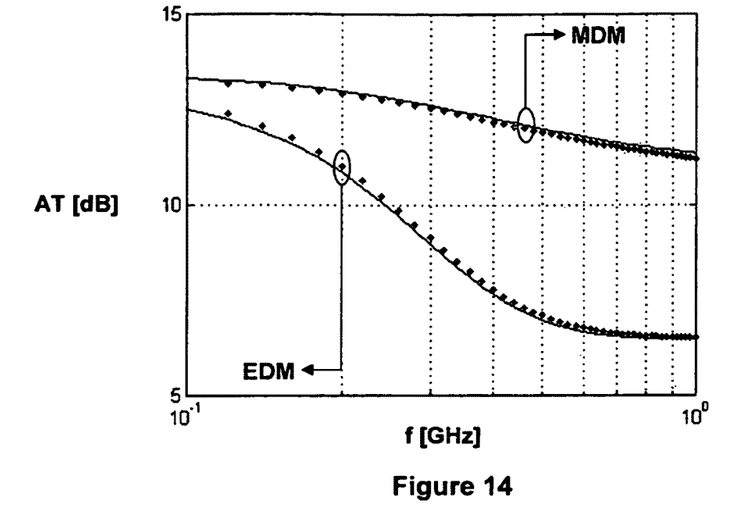
FIGS. 14 and 15 are graphics showing curves representing the attenuation and the phase-shift measured with an antenna according to the invention compared to theoretical values, respectively.
Figure 15:
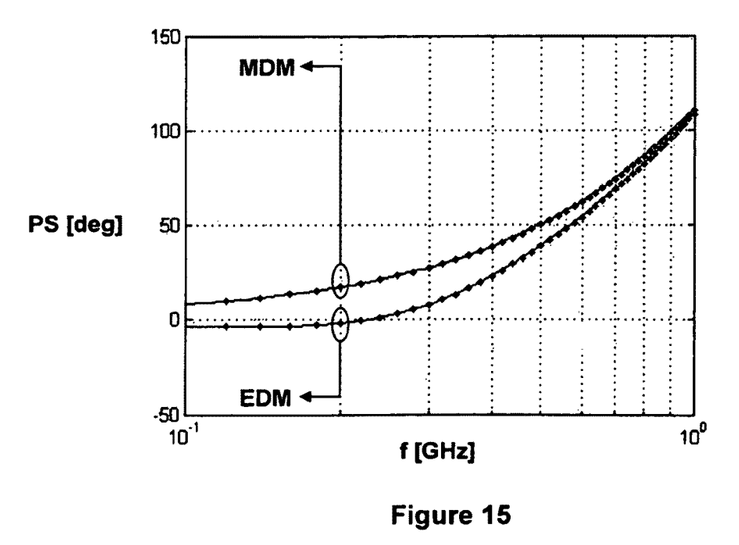

FIG. 14 represents graphic showing curves representing the attenuation AT measured (dotted line curve) with an antenna according to the invention compared to theoretical values (plain line curve) as a function of the frequency for the electric dipole mode (EDM) and the magnetic dipole mode (MDM). FIG. 15 represents graphic showing curves representing the phase-shift PS measured (dotted line curve) with an antenna according to the invention compared to theoretical values (plain line curve) as a function of the frequency for the electric dipole mode (EDM) and the magnetic dipole mode (MDM).

It is observed that with the antenna of the invention combined with the appropriate electronic elements and the above described calculation method, an excellent agreement is obtained between measured values and theoretical values.

The combination of an antenna element having a simple design coupled to an appropriate electronic circuit enables operating the antenna according to a superposition of a pure magnetic dipole and a pure electric dipole mode, and further mathematically separating the contribution of the magnetic dipole mode and the electric dipole mode. The measurement contribution related to the magnetic dipole mode (MDM) enables a deep radial depth of investigation into the formation. The measurement contribution related to the electric dipole mode (EDM) enables a shallow radial depth of investigation into the formation or into the mudcake when present on the borehole wall.

Based on the attenuation and phase-shift measurements, the permittivity $\epsilon$ and the conductivity a of the formation can be calculated by means of a known inversion calculation The antennas of the invention are comprised in an electromagnetic logging apparatus (see FIG. 1). The electromagnetic logging apparatus can implement a method to determine the electromagnetic properties of the medium surrounding the borehole. The structure and operation of such an electromagnetic logging apparatus is described in details in the patent application published under No EP 1 693 685 (filed on 22 Feb. 2005), which is incorporated herein by reference. The electromagnetic probe of the present invention differs from the one of EP 1 693 685 in that it comprises the antennas of the invention as hereinbefore described.

While the logging apparatus is being run through the borehole and the pad engaged with the borehole wall (FIG. 1), electromagnetic signals are radiated into the formation surrounding the borehole by the transmitting antennas Tu, Td. The attenuation and phase-shift of the electromagnetic signals are measured by means of the receiving antennas Ru, Rd.

Figure 16:
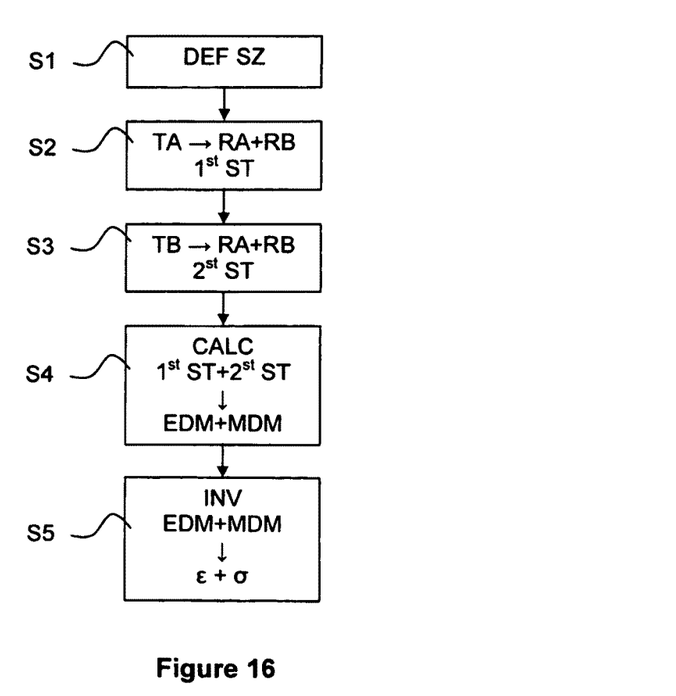
FIG. 16 is a diagram illustrating the steps of the method of investigation of the invention.

A method of investigation using the antennas of the invention will now be described in relation with FIG. 16. In a first step (S1), the logging apparatus is run through the borehole and a pad is engaged with a borehole wall so as to define a selected zone SZ made of a medium to be investigated (see FIGS. 1 and 2).

In a second step (S2), the antennas are operated by activating a first port of the transmitting antenna (for example TA—see FIGS. 8 and 10) so that each antenna defines a superposed pure magnetic dipole and pure electric dipole. As a consequence, electromagnetic signals are radiated in the medium. Simultaneously, a first set of measurements is performed comprising measuring a first and a second sub-set of attenuation and phase shift of the electromagnetic signals having traveled in the medium between the transmitting and receiving antennas at a first port (RA) and a second port (RB) of the receiving antenna (see FIGS. 9 and 11), respectively.

In a third step (S3), the antennas are operated by activating a second port of the transmitting antenna (for example TB—see FIGS. 8 and 10) so that each antenna defines a superposed pure magnetic dipole and pure electric dipole. As a consequence, electromagnetic signals are radiated in the medium. Simultaneously, a second set of measurements is performed comprising measuring a third and a fourth sub-set of attenuation and phase shift of the electromagnetic signals having traveled in the medium between the transmitting and receiving antennas at a first port and a second port of the receiving antenna (see FIGS. 9 and 11), respectively.

In a fourth step (S4), calculation can be performed based on the first, second, third and fourth sub-set measurement of attenuation and phase shift. These measurements are combined and a first contribution due to the pure magnetic dipole (MDM) and a second contribution due to the pure electric dipole (EDM) are extracted. With these measurements, it is now possible in a fifth step (S5) to determine the permittivity c and the conductivity σ of the medium in the selected zone by means of an inversion calculation as hereinbefore described.

The first set of measurements (step S2) and the second set of measurements (step S3) may be performed sequentially. In this case, the first (TA) and second (TB) ports are preferably activated by electrical signals having identical frequencies.

The first set of measurements (step S2) and the second set of measurements (step S3) may also be performed simultaneously. In this case, the first (TA) and second (TB) ports are preferably activated by electrical signals having different frequencies.

Advantageously, in electromagnetic logging apparatus comprising at least two transmitting antennas Tu, Td and at least two receiving antennas Ru, Rd (configuration shown in FIGS. 2 and 3), differential measurements between the attenuation and phase shift measured at the ports of the at least two receiving antennas can be performed and a borehole compensation scheme can be applied. As illustrated in the hereinbefore formulae, this enables eliminating each antenna gain from the calculation of the medium properties.

Final Remarks

A particular application of the invention relating to a wireline tool has been described. However, it is apparent for a person skilled in the art that the invention is also applicable to a logging-while-drilling tool. A typical logging-while-drilling tool is incorporated into a bottom-hole assembly attached to the end of a drill string with a drill bit attached at the extreme end thereof. Measurements can be made either when the drill string is stationary or rotating. In the latter case an additional measurement is made to allow the measurements to be related to the rotational position of the drill string in the borehole. This is preferably done by making simultaneous measurements of the direction of the earth's magnetic field with a compass, which can be related to a reference measurement made when the drill string is stationary.

It will also be apparent for a person skilled in the art that the invention is applicable to onshore and offshore hydrocarbon well location.

It is apparent that the term "pad" used hereinbefore generically indicates a contacting element with the surface of the borehole wall. The particular contacting element shown in the Figures for maintaining the antennas in engagement with the borehole wall is illustrative and it will be apparent for a person skilled in the art that other suitable contacting element may be implemented, for example a sonde with a backup arm, a centralizer, etc. . .

The same remark is also applicable to the particular probe deploying system shown on the Figures.

Finally, it is also apparent for a person skilled in the art that application of the invention to the oilfield industry is not limited as the invention can also be used in others types of geological surveys.

The drawings and their description illustrate rather than limit the invention. Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. An electromagnetic logging apparatus used in investigation of geological formations (GF) surrounding a borehole (WBH), comprising:
   a logging tool (TL) moveable through the borehole,
   an electromagnetic probe (1) comprising a pad (2) mounted on the logging tool (TL), adapted for engagement with the borehole wall (WBW) by a wall-engaging face of the pad,
   at least one antenna (Tu, Td) mounted in the wall-engaging face and used as a transmitting antenna,
   a plurality of spaced antennas (Ru, Rd) mounted in the wall-engaging face and used as receiving antennas positioned in spaced relation to the transmitting antenna (Tu, Td),
   a transmitter module (44T) adapted for energizing the transmitting antenna to transmit electromagnetic energy into the formations at a determined frequency according to an electric dipole mode and according to a magnetic dipole mode, and
   a receiver module (44R) adapted for receiving and processing an output signal at each of the receiving antennas representative of electromagnetic energy received from the formations.

2. A method of investigation of geological formations (GF) surrounding a borehole (WBH) using an electromagnetic logging apparatus comprising at least one transmitting antenna (Tu, Td) and at least one receiving antenna (Ru, Rd), wherein the method comprises the steps of: a) running (S1) the electromagnetic logging apparatus through the borehole and engaging a pad with a borehole wall so as to define a selected zone (SZ) made of a medium to be investigated, b) performing a first set of measurements (S2) by: b1) operating the at least one transmitting antenna and the at least one receiving antenna so that each antenna defines a superposed pure magnetic dipole and pure electric dipole by activating a first port of the transmitting antenna (TA), and radiating electromagnetic signals in the medium, b2) measuring a first and a second sub-set of attenuation and phase shift of the electromagnetic signals having traveled in the medium between the transmitting and receiving antennas at a first port (RA) and a second port (RB) of the receiving antenna, respectively, c) performing a second set of measurements (S3) by: c1) operating the at least one transmitting antenna and the at least one receiving antenna so that each antenna defines a superposed pure magnetic dipole and pure electric dipole by activating a second port of the transmitting antenna (TB), and radiating electromagnetic signals in the medium, c2) measuring a third and a fourth sub-set of attenuation and phase shift of the electromagnetic signals having traveled in the medium between the transmitting and receiving antennas at the first port (RA) and the second port (RB) of the receiving antenna, respectively, d) combining the first and the second set of measurements and mathematically extracting a first contribution due to the pure magnetic dipole and a second contribution due to the pure electric dipole (S4), and e) performing an inversion calculation (S5) based on the first and second contribution and determining the permittivity .epsilon. and the conductivity of the in the selected zone.

3. A method of investigation according to claim 2, wherein the first set of measurements (S2) and the second set of measurements (S3) are performed sequentially, the first and second ports (TA, TB) being activated by electrical signals having identical frequencies.

4. A method of investigation according to claim 2, wherein the first set of measurements (S2) and the second set of measurements (S3) are performed simultaneously, the first and second ports (TA, TB) being activated by electrical signals having different frequencies.

5. A method of investigation according to claim 2, wherein the electromagnetic logging apparatus comprises at least two transmitting antennas (Tu, Td) and at least two receiving antennas (Ru, Rd), and wherein the method further comprises performing differential measurements between the attenuation and phase shift measured at the ports of the at least two receiving antennas and applying a borehole compensation scheme so as to eliminate each antenna gain.

* * * * *